US011420747B2

(12) United States Patent
Rossini

(10) Patent No.: US 11,420,747 B2
(45) Date of Patent: Aug. 23, 2022

(54) CONSOLE MOUNTED PILOT TRAY ASSEMBLY

(71) Applicant: Inflight Holdings, Eden Prairie, MN (US)

(72) Inventor: Trever Andrew Rossini, Shakopee, MN (US)

(*) Notice: Subject to any disclaimer, the term of this patent is extended or adjusted under 35 U.S.C. 154(b) by 343 days.

(21) Appl. No.: 16/783,870

(22) Filed: Feb. 6, 2020

(65) Prior Publication Data

US 2021/0070447 A1 Mar. 11, 2021

Related U.S. Application Data

(63) Continuation-in-part of application No. 16/566,651, filed on Sep. 10, 2019, now Pat. No. 11,201,743.

(51) Int. Cl.
*B64D 11/00* (2006.01)

(52) U.S. Cl.
CPC ...... *B64D 11/00* (2013.01); *B64D 2011/0046* (2013.01)

(58) Field of Classification Search
CPC .... B64D 11/00; B64D 43/00; B64D 11/0639; A47C 7/70
See application file for complete search history.

(56) References Cited

U.S. PATENT DOCUMENTS

| | | | | |
|---|---|---|---|---|
| 1,790,468 A * | 1/1931 | Frank | ...................... | A47B 5/04 108/134 |
| 5,092,652 A * | 3/1992 | Macaluso | .............. | A47B 13/16 108/26 |
| 7,566,039 B2 * | 7/2009 | Hung | .................. | A47B 21/0314 248/371 |
| 9,180,805 B2 * | 11/2015 | Millan | .................... | B60N 3/004 |
| 9,592,771 B2 * | 3/2017 | Guering | ................. | B64D 45/00 |
| 10,696,408 B2 * | 6/2020 | Miedema | ............... | B60N 3/004 |
| 10,829,221 B2 * | 11/2020 | Pence | .................... | A47B 5/006 |
| 11,008,117 B1 * | 5/2021 | Dam | ................... | G06F 3/03547 |
| 2004/0075024 A1 * | 4/2004 | Healy | .................... | B64D 11/00 244/118.5 |
| 2016/0101865 A1 * | 4/2016 | Flynn | ..................... | B64D 43/00 244/118.5 |
| 2018/0334261 A1 * | 11/2018 | Longo | ................. | B60R 11/0252 |

FOREIGN PATENT DOCUMENTS

| | | | | |
|---|---|---|---|---|
| RU | 2739085 C1 * | 12/2020 | ............... | A47B 1/00 |
| WO | WO-2012110725 A2 * | 8/2012 | ............. | B64D 11/00 |

* cited by examiner

*Primary Examiner* — Benjamin P Lee

(57) ABSTRACT

A console mounted pilot tray assembly includes an aircraft cockpit having a console. A seat is mounted in the aircraft and faces the console. A side stick is mounted laterally to the console and a leg receiving space is positioned under the console. A mount is positioned under and is mounted to the console. The mount includes a guide rail. A panel has a top side, a bottom side, a front edge, a rear edge, a first side edge and a second side edge. A slide attached to the panel and is moveably mounted to the guide rail. The panel is moved along the guide rail and under the console to define a stored position. The panel is moved to a deployed position. The deployed position is defined as the panel extending outwardly away from the guide rail and the console.

14 Claims, 11 Drawing Sheets

CONSOLE MOUNTED PILOT TRAY ASSEMBLY

CROSS-REFERENCE TO RELATED APPLICATIONS

I hereby claim the benefit under 35 U.S.C., Section 120 of U.S. application Ser. No. 16/566,651 filed Sep. 10, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to a stowable tray device and more particularly pertains to a new stowable tray device particularly well suited for usage by an aircraft pilot. The device of disclosure provides a tray for the pilot in such a manner that its positioning does not interfere with flight controls. The tray, in turn, provides a location for the pilot to place food or other articles such that these items need not be held while flying which can interfere with the pilot's duties as well as be cumbersome within the small confines of a cockpit. While in the stowed position, the tray also will not interfere with the usable leg space of the cockpit.

(2) Description of Related Art Including Information Disclosed Under 37 CFR 1.97 and 1.98

The prior art relates to stowable tray devices which provide a location for the placement of food, electronics, paperwork or other like articles. Such devices are typically stowable when not in use, however these devices are not suitable for usage in a cockpit where space is more constrained and a tray might otherwise interfere with.

BRIEF SUMMARY OF THE INVENTION

An embodiment of the disclosure meets the needs presented above by generally comprising an aircraft cockpit having a console. A seat is mounted in the aircraft and faces the console. A side stick is mounted laterally to the console and a leg receiving space is positioned under the console. A mount is positioned under and is mounted to the console. The mount includes a guide rail. A panel has a top side, a bottom side, a front edge, a rear edge, a first side edge and a second side edge. A slide is attached to the panel and is moveably mounted to the guide rail. The panel is moved along the guide rail and under the console to define a stored position. The panel is moved to a deployed position. The deployed position is defined as the panel extending outwardly away from the guide rail and the console.

In another embodiment, the invention includes a mount including a guide rail. A panel is provided having a top side, a bottom side, a front edge, a rear edge, a first side edge and a second side edge. A slide is attached to the panel and is moveably mounted to the guide rail. The panel is moved forward toward the guide rail to define a stored position and moved outwardly away from the guide rail to a deployed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
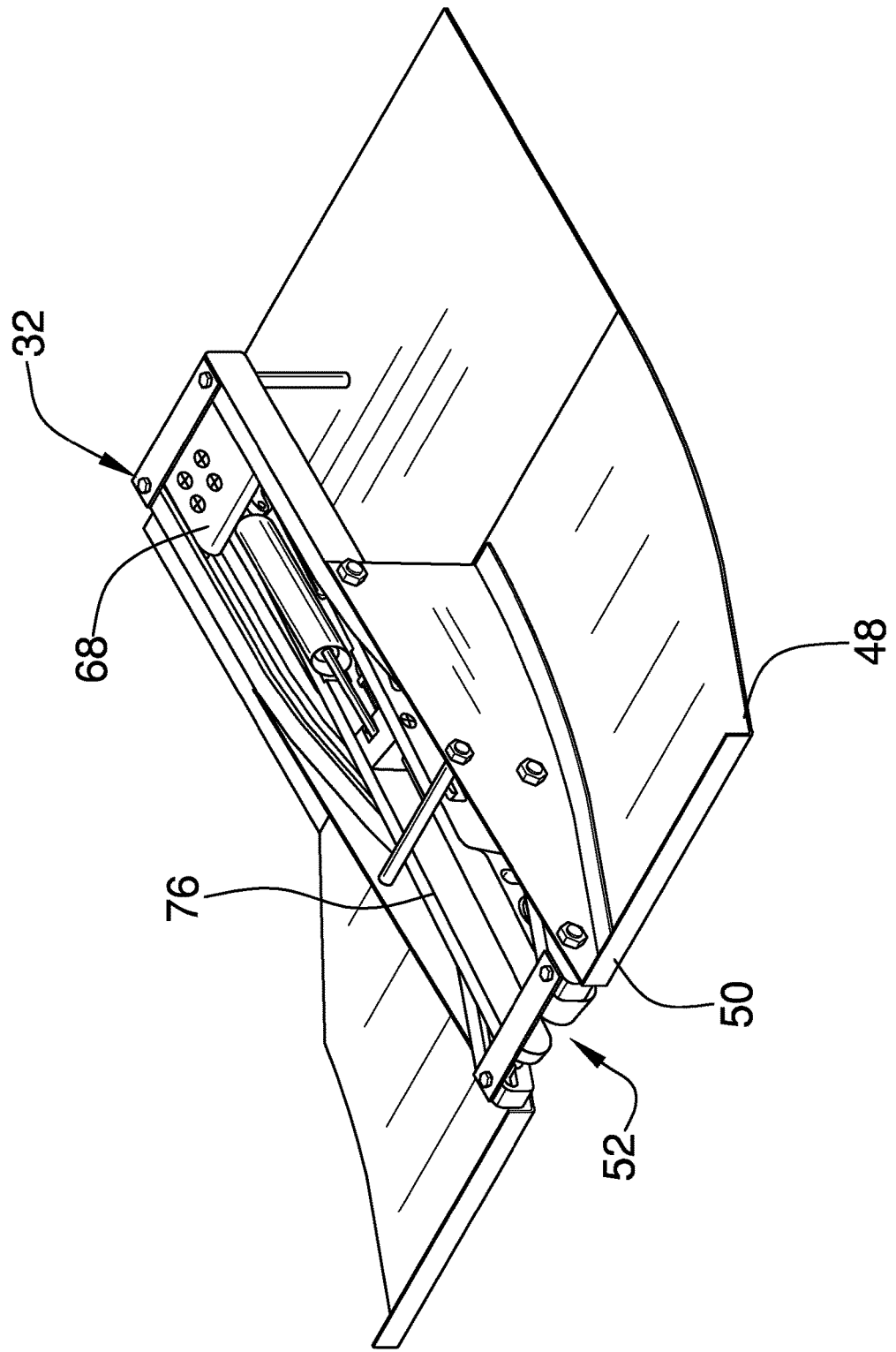
FIG. 1 is a top isometric view of a console mounted pilot tray assembly according to an embodiment of the disclosure.
Figure 2:
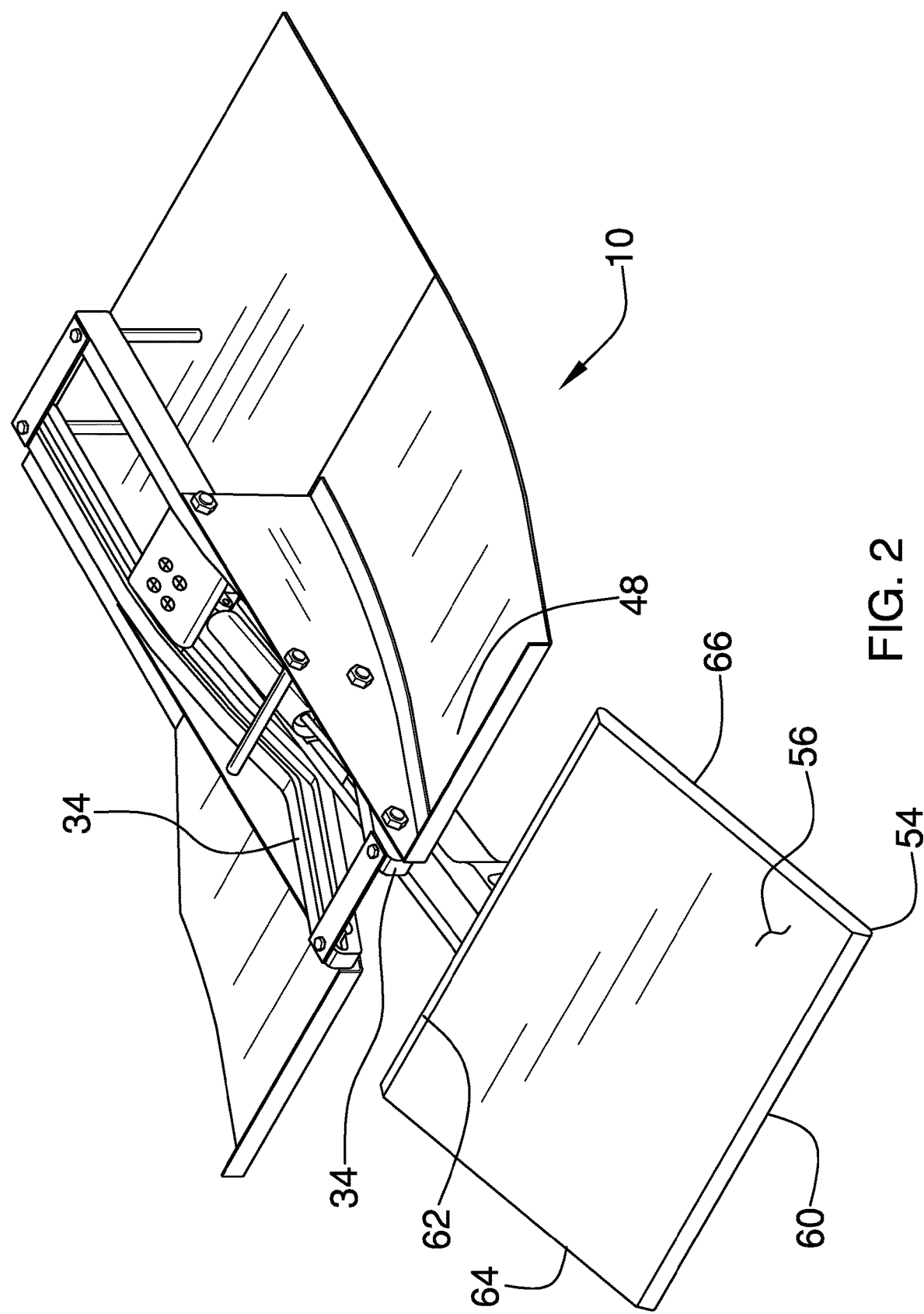
FIG. 2 is a top isometric view of an embodiment of the disclosure in a partially deployed condition.
Figure 3:
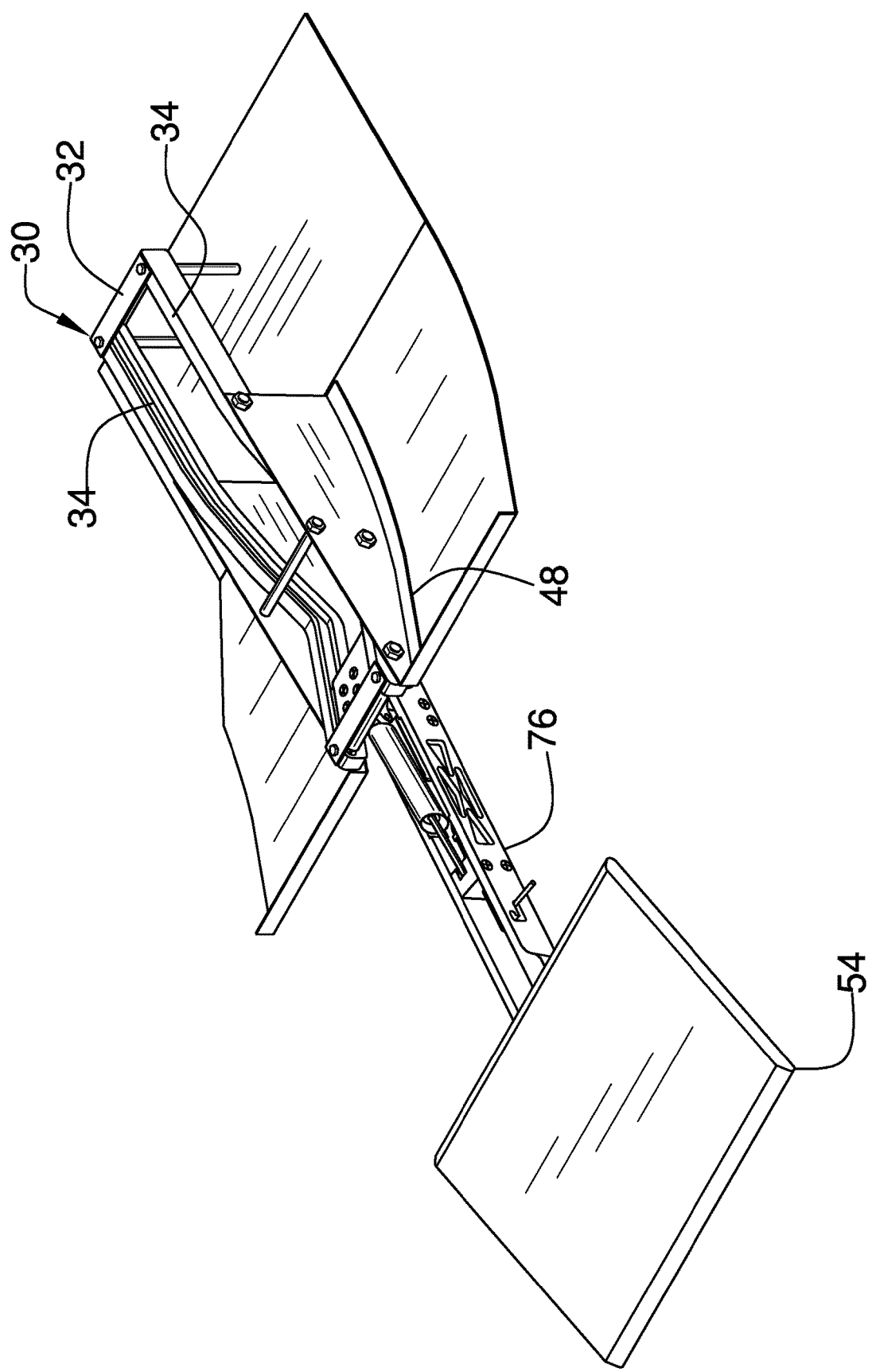
FIG. 3 is a top isometric view of an embodiment of the disclosure in a fully deployed condition.

With reference now to the drawings, and in particular to FIGS. 1 through 11 thereof, a new stowable tray device embodying the principles and concepts of an embodiment of the disclosure and generally designated by the reference numeral 10 will be described.

Figure 9:
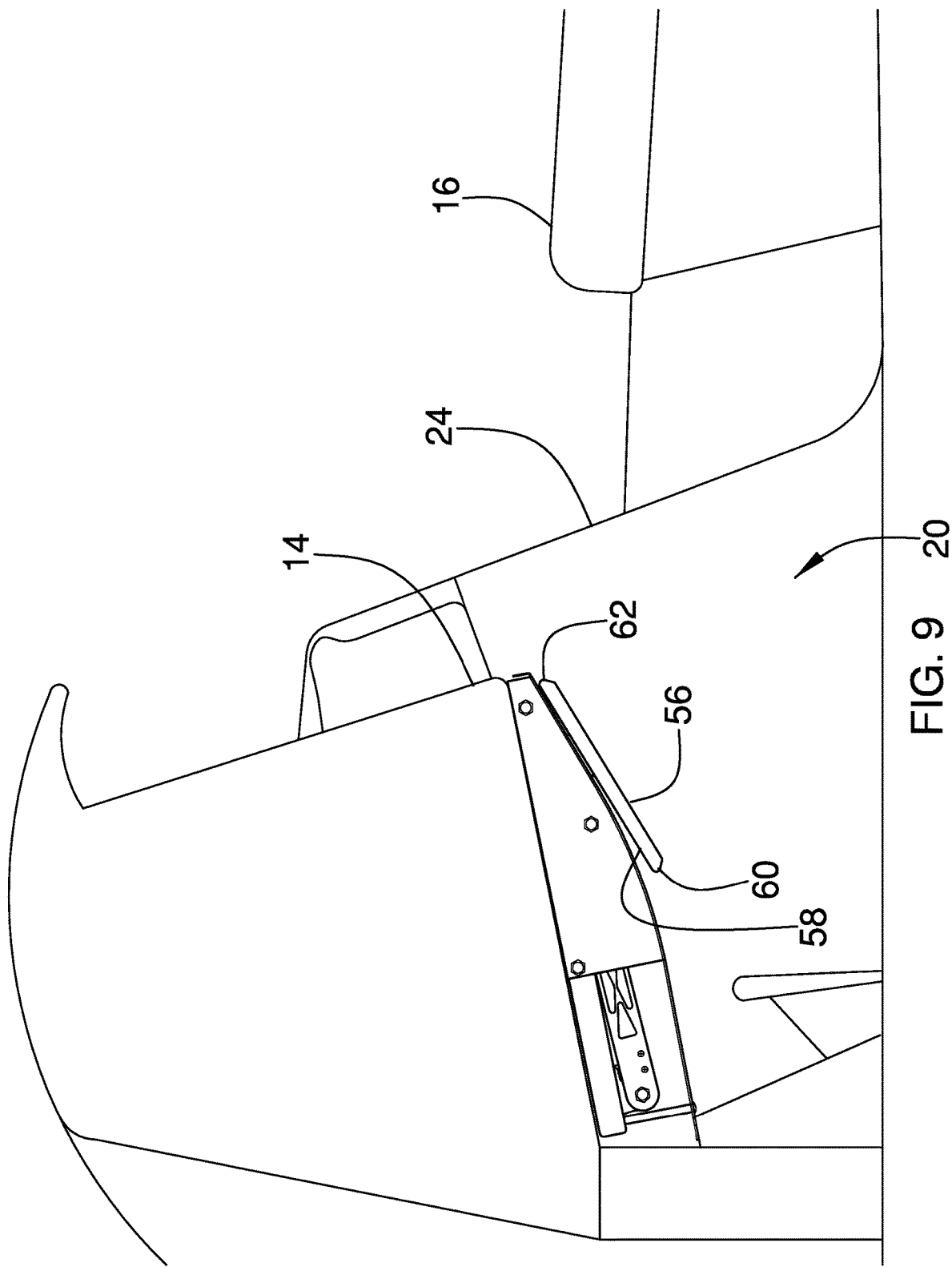
FIG. 9 is a side view of an embodiment of the disclosure in a stored condition.
Figure 10:
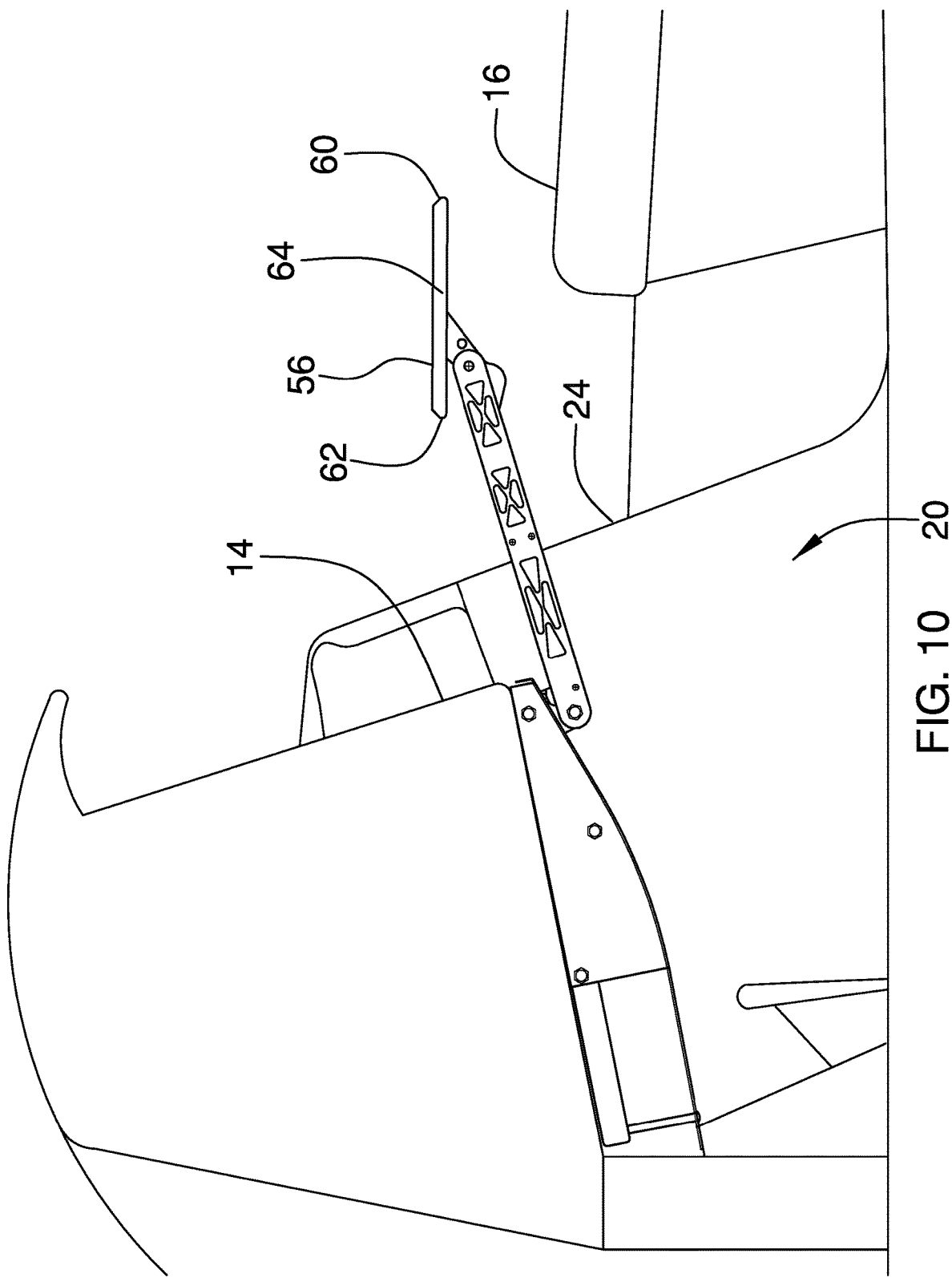
FIG. 10 is a side view of an embodiment of the disclosure in a deployed condition.
Figure 11:
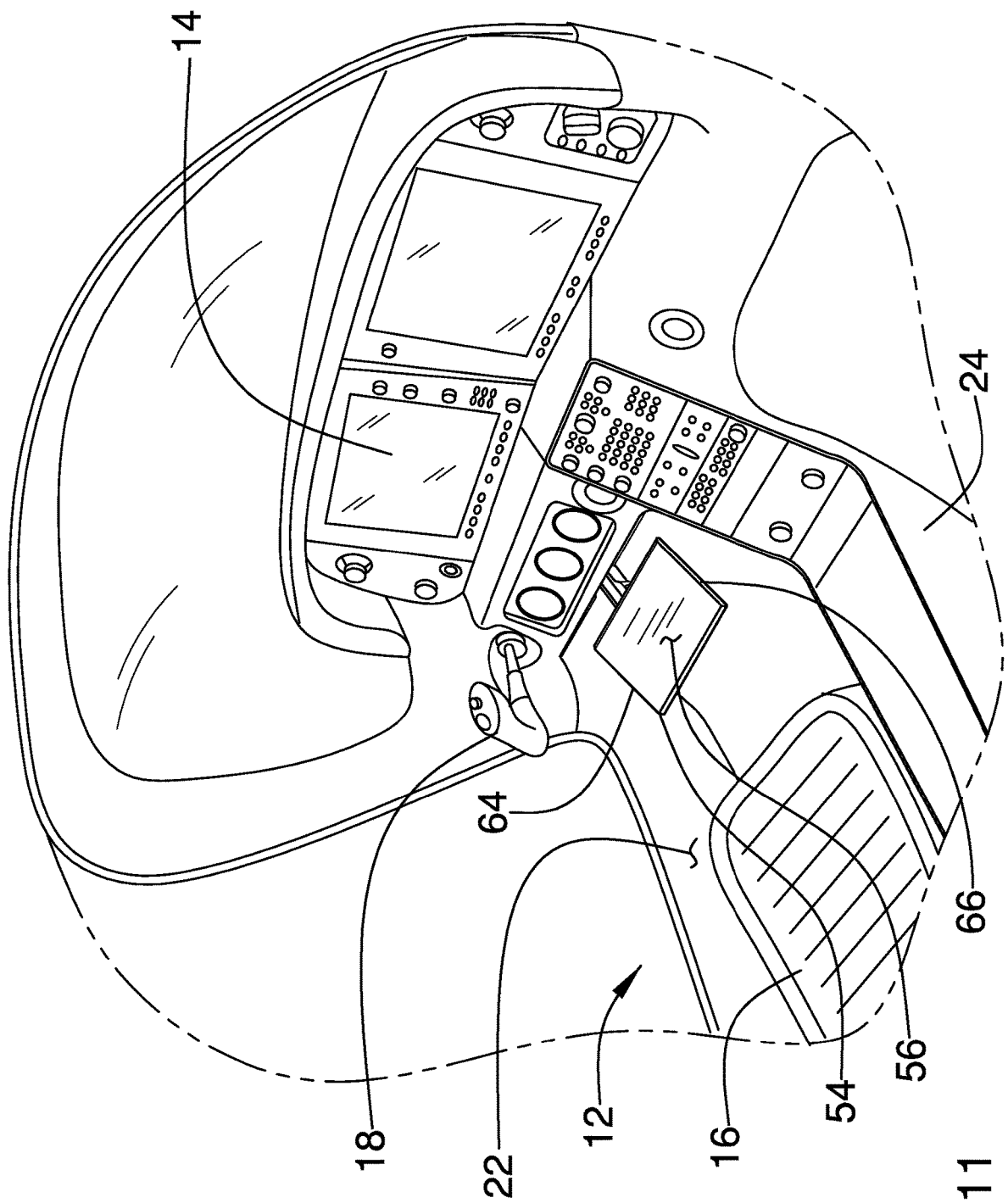
FIG. 11 is a top isometric view of an embodiment of the disclosure showing a panel thereof in a deployed condition within a cockpit.

As best illustrated in FIGS. 1 through 11, the console mounted pilot tray assembly 10 generally comprises a device that is used within an aircraft cockpit 12 having a console 14. A seat 16 is mounted in the aircraft and faces the console 14. The assembly 10, in particular, is well suited for usage in a plane having a side stick 18 that is mounted laterally to the console 14 and away from a central area of the console 14. The side stick 18 is used for controlling the direction of the plane and differs from other types of aircraft which utilize a control wheel or other seat-centered control "joystick." A leg receiving space 20 is positioned under the console 14 and the seat 16 is bounded by a first side wall 22 and a second side wall 24 each extending rearwardly from the console 14. The second side wall 24 is typically centered with the console 14 and may be used for instrumentation. Thus, as defined herein, the first side wall 22 is also typically an exterior of wall of the aircraft. The side stick 18 is positioned on, abutting, or adjacent to the first side wall 22 as is shown in FIG. 11. Such a configuration is most notable in Cirrus branded aircraft.

A mount 30 is positioned under and is mounted to the console 14. The mount 30 comprises a guide rail 32 that includes a pair of elongated tracks 34 extending from a rear end 36 of the mount 30 to a front end 38 of the mount 30. The tracks 34 are laterally spaced from each other and face each other such that the tracks 34 are mirror images of each other. As shown best in FIGS. 2-4, the tracks 34 each include a front section 40 and a rear section 42. The front sections 40 may each have a V-shape with a terminal end 44 positioned adjacent to the front end 38 of the mount 30. Each of the front sections 40 has a notch 46 downwardly extending therein and the notches 46 are positioned adjacent to an associated one of the terminal ends 44. The rear sections 42 are each substantially linear and is angled rearwardly and downwardly when the mount 30 is attached to the console 14 as is shown in FIG. 10.

A housing 48 may be attached to a bottom side of the mount 30 to form a covering over the mount 30 and which may be used to stabilize the components of the mount 30. As can be seen in FIG. 1, the housing 48 forms a base for attachment to the tracks 34. The housing 48 has a forward edge 50 having a slot 52 therein that is aligned with the guide rail 32. The housing 48 may have multiple openings extending therethrough, not shown, to allow for access to or positioning through of elements attached to an underside of the console 14. The mount 30, including the tracks 34 and housing 48 may be attached to the console 14 with any conventional fastening structure including mechanical fasteners and adhesives.

A panel 54 has a top side 56, a bottom side 58, a front edge 60, a rear edge 62, a first side edge 64 and a second side edge 66. The first side edge 64 is positioned adjacent to the first side wall 22. The panel 54 has a width from the first side edge 64 to the second side edge 66 being greater than 8.0 inches and a depth from the front edge 60 to the rear edge 62 greater than 7.0 inches. The panel 54 serves as a "tabletop" when deployed as described below. The panel 54 will be comprised of a rigid material such as plastics, glass, carbon composites, metals and the like.

A slide 66 is attached to the panel 54 and the slide 66 is moveably mounted to the guide rail 36. The slide 66 is also movable through the slot 52 in the forward edge 52 of the housing. Generally, the panel 54 is moved along the guide rail 32 and under the console 14 to define a stored position and the panel 54 is movable to a deployed position, wherein the deployed position is defined as the panel 54 extending outwardly away from the guide rail 32 and extended outwardly from the console 14. The deployed position is best depicted in FIG. 11, in particular.

The slide 66 includes a carriage 68 that is mounted to and extends between the tracks 34. The carriage 68 is movable along the tracks 34 and has a front side 70, a first lateral edge 72 and a second lateral edge 74. An arm 76 is attached to the carriage 68 and extends forwardly away from the front side 70. The arm 76 may be pivotable with respect to the carriage 68 and a biasing member 78 retains the arm 76 in a lifted position such that it is angled upwardly relative to the carriage 68. A locking member 80 releasably locks the arm 76 with respect to the carriage 68 and may include a rod 82 biased into engagement with a receiver 84 in the carriage 68 wherein the rod 82 may be pulled and released from the carriage 68 to again allow movement of the arm 76 relative to the carriage 68.

Figure 5:
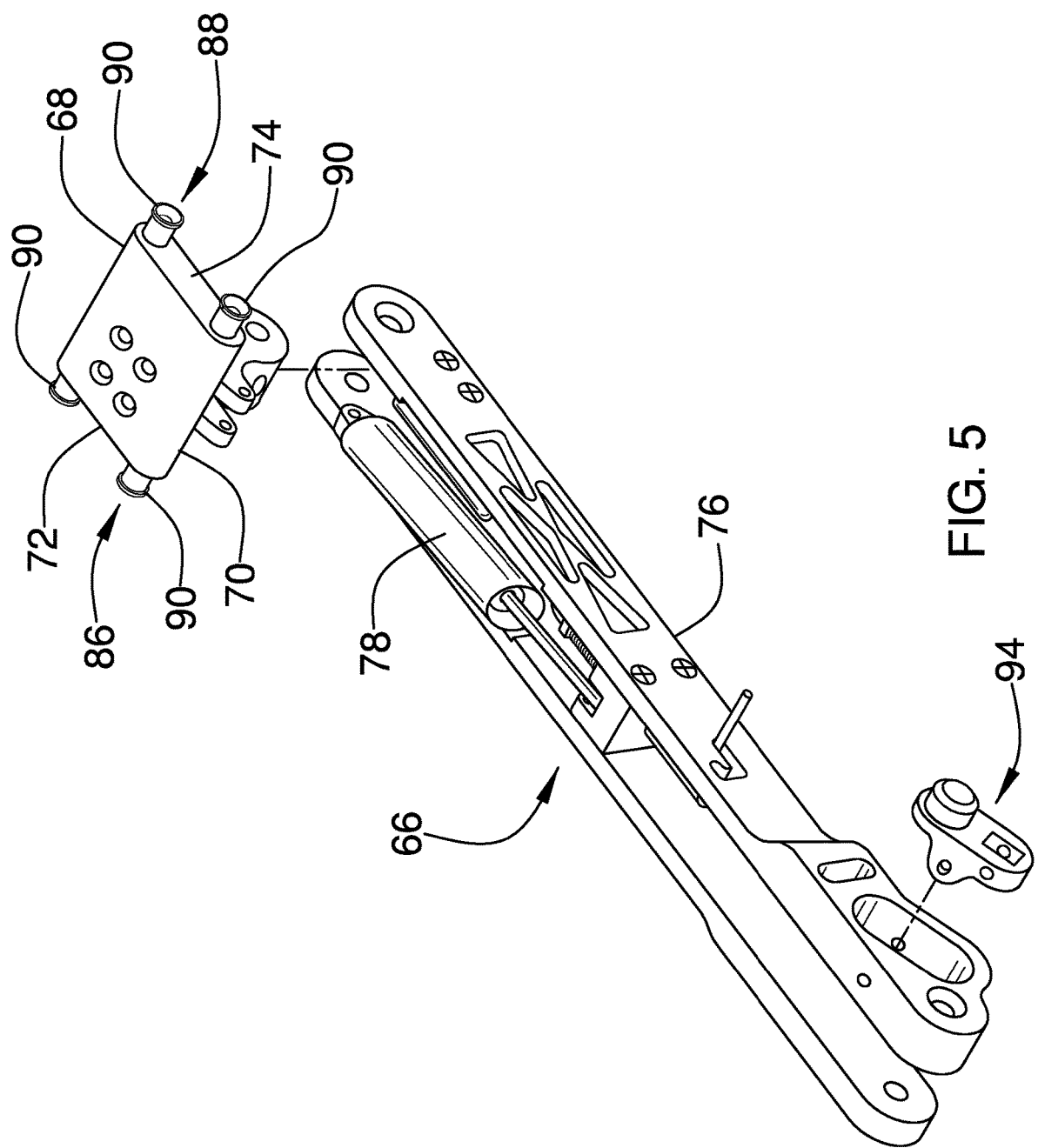
FIG. 5 is an exploded isometric view of a slide of an embodiment of the disclosure.
Figure 6:
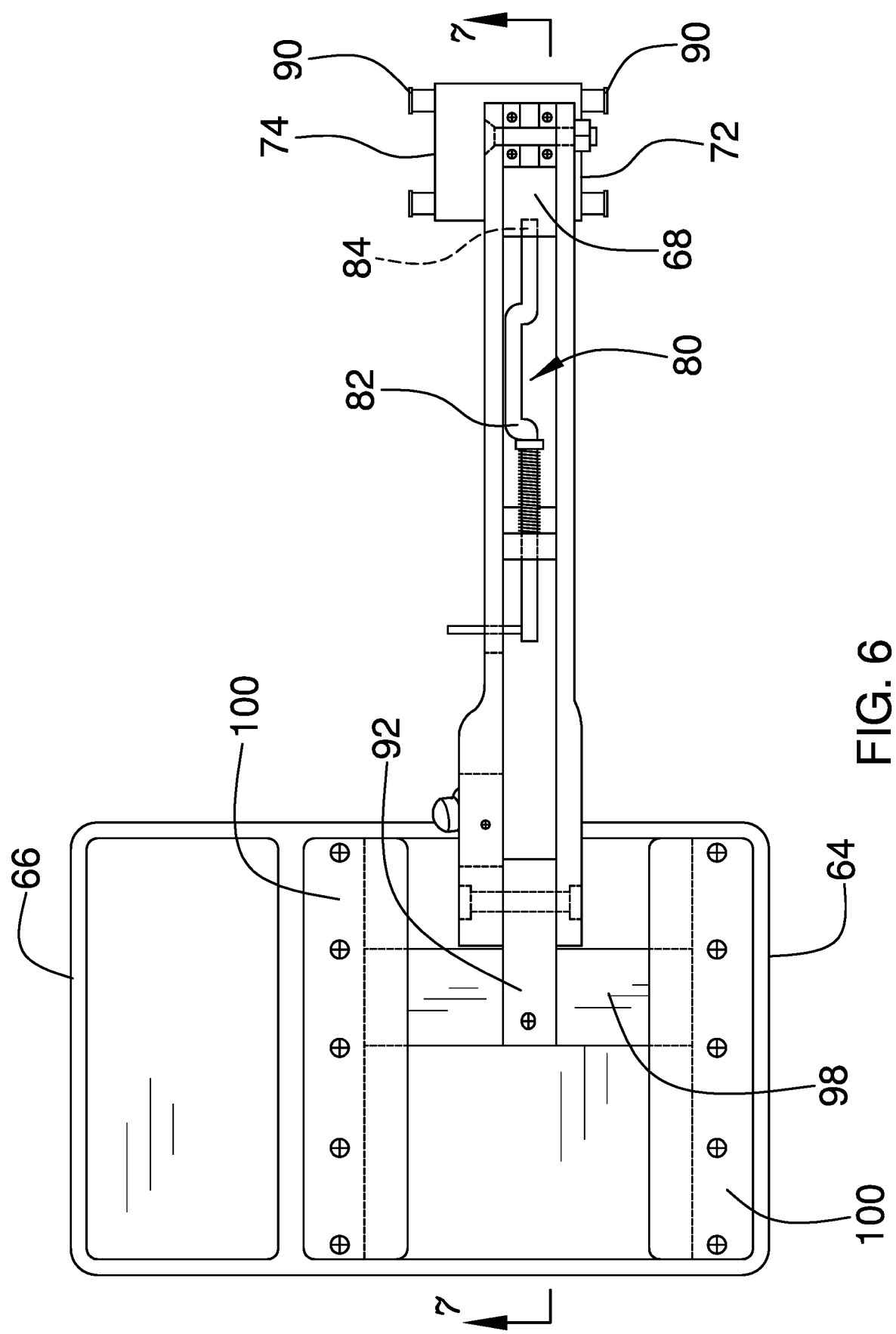
FIG. 6 is a bottom view of an embodiment of the disclosure.
Figure 7:
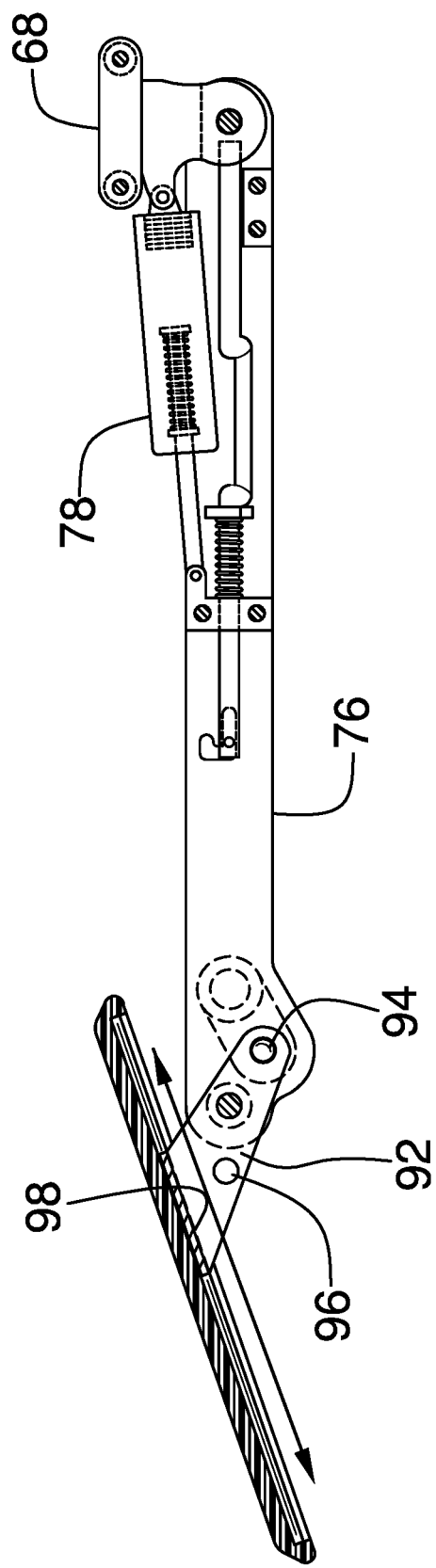
FIG. 7 is a cross-sectional view of an embodiment of the disclosure taken along line 7-7 of FIG. 6.

With respect to the carriage 68 and as shown in FIG. 5, a first guide 86 is attached to the first lateral edge 72 and a second guide 88 is attached to the second lateral 74. The first guide 86 is positioned in one of the tracks 34 and the second guide 88 is positioned in another one of the tracks 34 such that the first 86 and second 88 guides are movable along the tracks 34. The first 86 and second 88 guides may each include a pair of lateral extending members 90 that may or may not be rotatable with respect to the carriage 68. As seen in FIG. 5, the lateral extending members 90 may be cylindrical and may comprise rotatable rollers or static pins having a low coefficient of friction with respect to the tracks 34. The first 86 and second 88 guides is removably positionable in one of the notches 46 to releasably lock the carriage 68 in the deployed position. More specifically, the forwardly positioned ones of the lateral extending members 90 engage the notches 46 and can be lifted out of the notches 46 to release the carriage 68 from the notches 46.

A bracket 92 is attached to the bottom side 58 of the panel 54 and is also attached to the slide 66 to secure the panel 54 to the slide 66. As can be seen in the Figures, the V-shape of the front sections 40 of the tracks 34 serves to ensure that the arm 76 and panel 54 can move downwardly and then upwardly as the arm 76 is extended from the console 14. Thus, as the carriage 68 moves to the forward side of the "V" the arm 76 is lifted/angled upwardly to increase a height of the panel 54 relative to the seat 16. The rear sections 42 of the tracks 34 are angled backward, however, to help retain the carriage 68 in the stored position.

Figure 8:
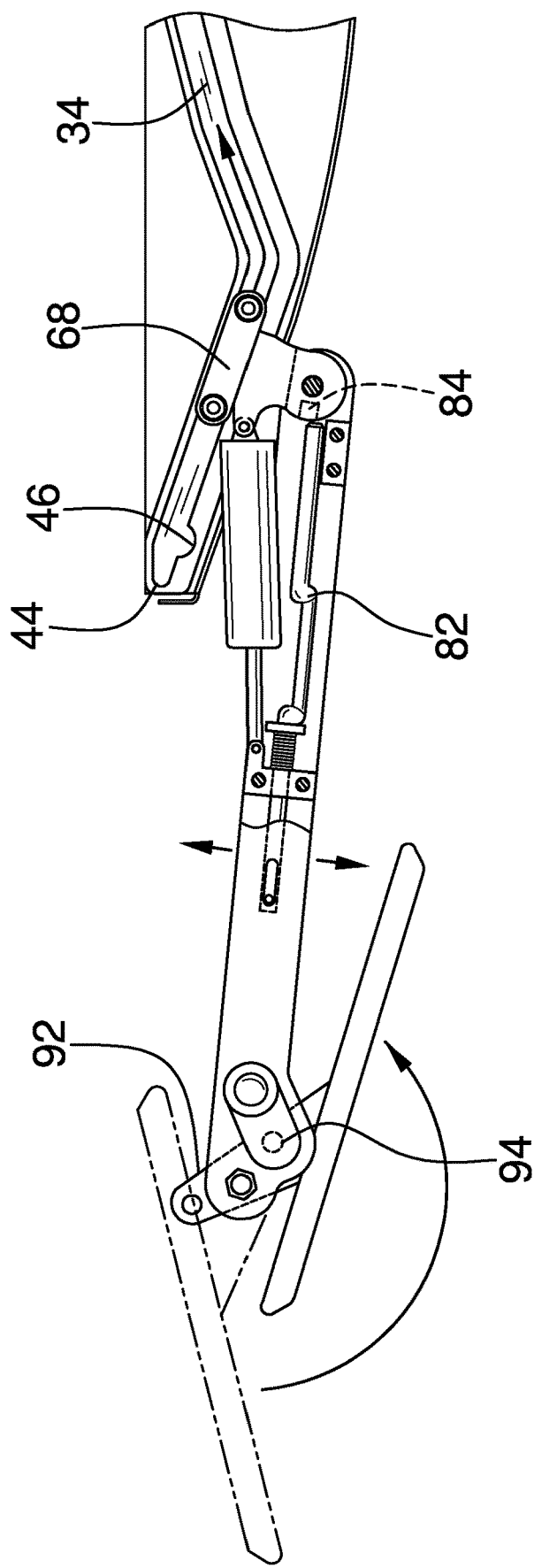
FIG. 8 is a side broken view of an embodiment of the disclosure.

More specifically, the bracket 92 may be pivotably coupled to the slide 66, or to the panel 54, such that the panel 54 can be moved between an upright position having the top side 56 facing upwardly or in a lowered position having the top side 56 facing downwardly. FIG. 8 demonstrates this movement. The bracket 92 is attached to the arm distal 76 to the carriage 68 such that the panel 54 is positioned under the arm 76 when the panel 54 is in the lowered position as shown in FIG. 9. The panel 54 is moved to the lowered position when the panel 54 in the stored position and moreover will be positioned under the housing 48 when the panel 54 is in the lowered position. A securing member 94 is mechanically engageable with the bracket 92 to retain the bracket 92 in the upright or the lowered positions. The securing member 94 can be seen in FIG. 4 and may comprise a rocker pin that engages the bracket 92 at one of two apertures 96 depending on if the panel 54 is in the upright or lowered position. When the panel 54 is secured in the upright position, its top side 56 is generally parallel to the floor of the cockpit, or, more particularly, it is horizontally orientated when the aircraft is horizontally orientated. The arm 76 extends upwardly at an angle of between 5° and 35° from the carriage 68 when the slide 66 is fully deployed and the arm 76 locked relative to the carriage 68.

Figure 4:
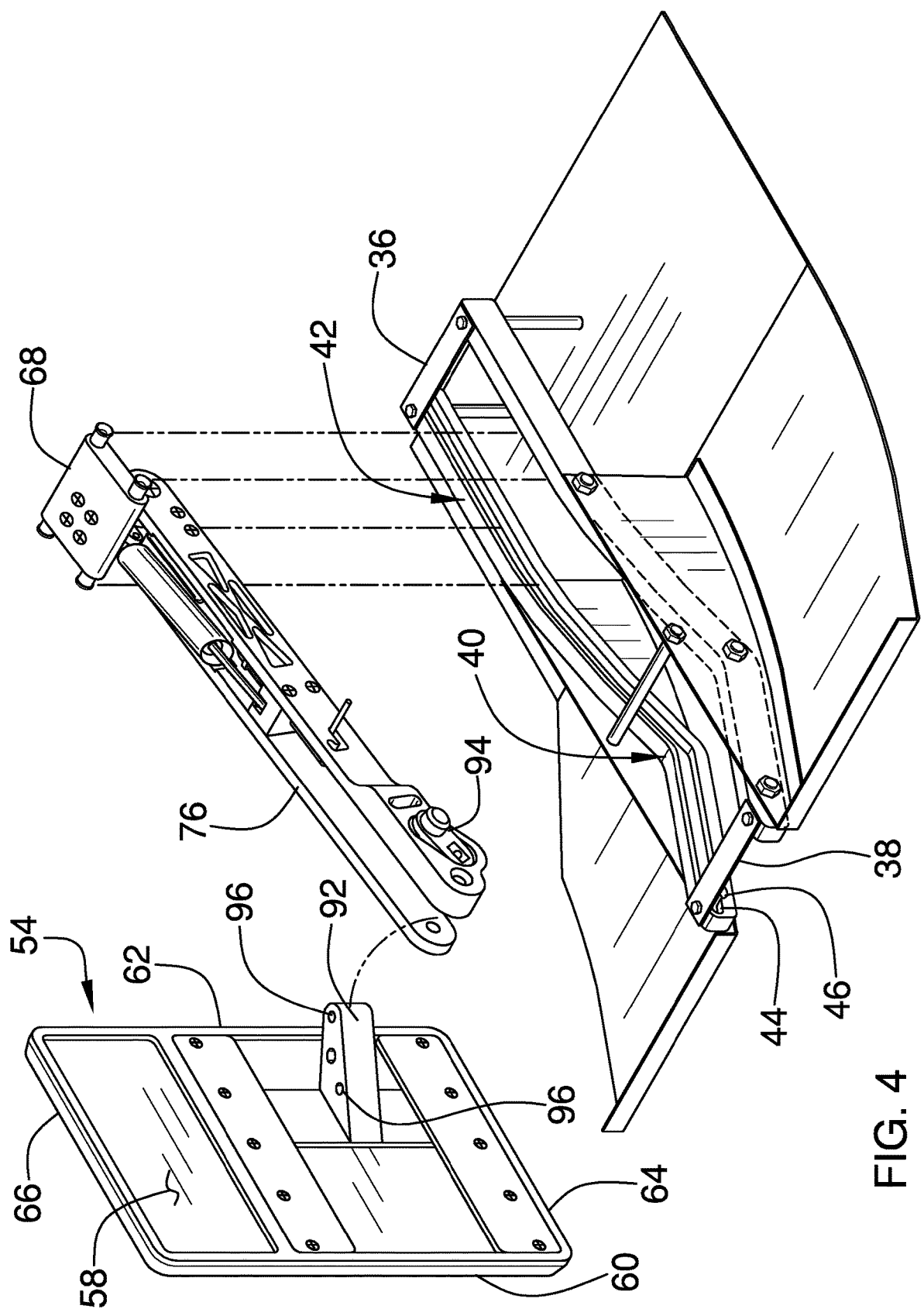
FIG. 4 is an exploded isometric view of an embodiment of the disclosure.

With respect to the panel 54, the bracket 92 may be movable on the bottom side 58 of panel 54 between the front 60 and rear 62 edges of the panel. As shown in FIG. 4, the bracket 92 may be attached to a plate 98 slidably coupled to the panel 54 by mounts 100. This will allow the pilot to move the panel 54 nearer to, or farther away from, the seat 16. The bracket 92 is positioned nearer to the first side edge 64 than the second side edge 66. This causes the panel 54 to be laterally offset with respect to the arm 76 to move the panel 54 toward the second side wall 24 and away from the first side wall 22 and side stick 18 to prevent its interference with the controlling of the aircraft.

It should be understood that a pair of the assemblies 10 would likely be utilized at the same time as the cockpit 12 includes two front seats 16, each with a side stick 18. Thus, the panel 54 will be offset from the outer wall, i.e. first side wall 22, regardless on which side of the second side wall 24 the assembly 10 is mounted.

In use, the panel 54 is typically retained in its stored position such that the panel 54 is flipped upside down and slid back under the console 14 as shown in FIG. 9. When a person, seated in the seat 16, has need of a tabletop on which to eat, work, write, etc., the panel 54 is pulled outwardly with the arm and rotated to the upright position as shown in FIG. 11.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cockpit tray table system comprising:
   an aircraft cockpit having a console, a seat being mounted in the aircraft and facing the console, a side stick being mounted laterally to the console, a leg receiving space being positioned under the console;
   a mount being positioned under and being mounted to the console, the mount including a guide rail;
   a panel having a top side, a bottom side, a front edge, a rear edge, a first side edge and a second side edge;
   a slide attached to the panel, the slide being moveably mounted to the guide rail;
   the panel being moved along the guide rail and under the console to define a stored position, the panel being moved to a deployed position, the deployed position being defined as the panel extending outwardly away from the guide rail and extended outwardly from the console;
   wherein the mount comprises:
      the guide rail including a pair of elongated tracks extending from a rear end of the mount to a front end of the mount, the tracks being laterally spaced from each other and the tracks being a mirror image of each other;
   wherein the slide includes:
      a carriage being mounted to and extending between the tracks, the carriage being movable along the tracks, the carriage having a front side, a first lateral edge and a second lateral edge; and
      an arm being attached to the carriage and extending forwardly away from the front side, the panel being attached to the arm distal to the carriage;
   wherein the panel includes:
      a bracket being attached to the bottom side of the panel, the bracket being attached to the slide, the bracket being pivotably coupled to the slide such that the panel can be moved between an upright position having the top side facing upwardly or in a lowered position having the top side facing downwardly; and
      a securing member being mechanically engageable with the bracket to retain the bracket in the upright or the lowered positions; and
   a housing being attached to a bottom side of the mount and forming a covering, the housing having a forward edge having a slot therein aligned with the guide rail, the bracket is attached to the arm distal to the carriage, the panel being positioned under the arm when the panel is in the lowered position, the panel being moved to the lowered position when the panel in the stored position, the slide being movable through the slot, the panel being positioned under the housing when the panel is in the lowered position.

2. The cockpit tray table system according to claim 1, wherein:
   the seat is bounded by a first side wall and a second side wall each extending rearwardly from the console, the side stick being positioned on the first side wall;
   the first side edge of the panel being positioned adjacent to the first side wall; and
   the panel being offset with respect to the slide such that the slide is positioned nearer to the first side edge than the second side edge.

3. The cockpit tray table system according to claim 1, wherein the arm is pivotable with respect to the carriage, a locking member releasably locking the arm with respect to the carriage.

4. The cockpit tray table system according to claim 1, further including:
   a first guide being attached to the first lateral edge; and
   a second guide being attached to the second lateral edge, the first guide being positioned in one of the tracks and the second guide being positioned in another one of the tracks, the first and second guides being movable along the tracks;
   each of the tracks having a front section and a terminal end positioned distal to the carriage, each of the front sections having a notch downwardly extending therein and being positioned adjacent to an associated one of the terminal ends; and
   the first and second guides being removably positionable in one of the notches to releasably lock the carriage in the deployed position.

5. The cockpit tray table system according to claim 4, wherein the tracks each include a rear section, the front sections each having a V-shape and the terminal end positioned adjacent to the front end of the mount, the rear sections being substantially linear and being angled rearwardly and downwardly when the mount is attached to the console.

6. The cockpit tray table system according to claim 1, further including a housing being attached to a bottom side of the mount and forming a covering, the housing having a forward edge having a slot therein aligned with the guide rail, the slide being movable through the slot.

7. The cockpit tray table system according to claim 1, wherein the bracket is attached to the arm distal to the carriage, the panel being positioned under the arm when the panel is in the lowered position, the panel being moved to the lowered position when the panel is in the stored position.

8. The cockpit tray table system according to claim 1, wherein the bracket is movable on the bottom side of panel between the front and rear edges of the panel.

9. A cockpit tray table system comprising:
an aircraft cockpit having a console, a seat being mounted in the aircraft and facing the console, a side stick being mounted laterally to the console, a leg receiving space being positioned under the console, the seat being bounded by a first side wall and a second side wall each extending rearwardly from the console, the side stick being positioned on the first side wall;
a mount being positioned under and being mounted to the console, the mount comprising:
  a guide rail, the guide rail including a pair of elongated tracks extending from a rear end of the mount to a front end of the mount, the tracks being laterally spaced from each other and the tracks being a mirror image of each other, the tracks each including a front section and a rear section, the front sections each having a V-shape and a terminal end positioned adjacent to the front end of the mount, each of the front sections having a notch downwardly extending therein and being positioned adjacent to an associated one of the terminal ends, the rear sections being substantially linear and being angled rearwardly and downwardly when the mount is attached to the console;
  a housing being attached to a bottom side of the mount and forming a covering, the housing having a forward edge having a slot therein aligned with the guide rail;
a panel having a top side, a bottom side, a front edge, a rear edge, a first side edge and a second side edge, the first side edge being positioned adjacent to the first side wall;
a slide attached to the panel, the slide being moveably mounted to the guide rail, the slide being movable through the slot in the forward edge of the housing;
the panel being moved along the guide rail and under the console to define a stored position, the panel being moved to a deployed position, the deployed position being defined as the panel extending outwardly away from the guide rail and extended outwardly from the console;
the slide including:
  a carriage being mounted to and extending between the tracks, the carriage being movable along the tracks, the carriage having a front side, a first lateral edge and a second lateral edge;
  an arm being attached to the carriage and extending forwardly away from the front side, the arm being pivotable with respect to the carriage, a locking member releasably locking the arm with respect to the carriage;
  a first guide being attached to the first lateral edge;
  a second guide being attached to the second lateral edge, the first guide being positioned in one of the tracks and the second guide being positioned in another one of the tracks, the first and second guides being movable along the tracks, the first and second guides being removably positionable in one of the notches to releasably lock the carriage in the deployed position;
the panel including:
  a bracket being attached to the bottom side of the panel, the bracket being attached to the slide, the bracket being pivotably coupled to the slide such that the panel can be moved between an upright position having the top side facing upwardly or in a lowered position having the top side facing downwardly, the bracket being attached to the arm distal to the carriage, the panel being positioned under the arm when the panel is in the lowered position, the panel being moved to the lowered position when the panel in the stored position, the panel being positioned under the housing when the panel is in the lowered position;
  a securing member being mechanically engageable with the bracket to retain the bracket in the upright or the lowered positions;
  the bracket being movable on the bottom side of panel between the front and rear edges of the panel;
  the bracket being positioned nearer to the first side edge than the second side edge such that the panel is laterally offset with respect to the arm.

10. A cockpit tray table assembly configured to be mounted in a cockpit, the assembly comprising:
a mount including a guide rail;
a panel having a top side, a bottom side, a front edge, a rear edge, a first side edge and a second side edge;
a slide attached to the panel, the slide being moveably mounted to the guide rail;
the panel being moved forward toward the guide rail to define a stored position, the panel being moved outwardly away from the guide rail to a deployed position;
wherein the mount comprises:
  a guide rail including a pair of elongated tracks extending from a rear end of the mount to a front end of the mount, the tracks being laterally spaced from each other and the tracks being a mirror image of each other;
wherein the slide includes:
  a carriage being mounted to and extending between the tracks, the carriage being movable along the tracks, the carriage having a front side, a first lateral edge and a second lateral edge; and
  an arm being attached to the carriage and extending forwardly away from the front side, the panel being attached to the arm distal to the carriage;
wherein the panel includes:
  a bracket being attached to the bottom side of the panel, the bracket being attached to the slide, the bracket being pivotably coupled to the slide such that the panel can be moved between an upright position having the top side facing upwardly or in a lowered position having the top side facing downwardly; and a securing member being mechanically engageable with the bracket to retain the bracket in the upright or the lowered positions; and a housing being attached to a bottom side of the mount and forming a covering, the housing having a forward edge having a slot therein aligned with the guide rail, the bracket is attached to the arm distal to the carriage, the panel being positioned under the arm when the panel is in the lowered position, the panel being, moved to the lowered position when the panel in the stored position, the slide being movable through the slot, the panel being positioned under the housing when the panel is in the lowered position.

11. The cockpit tray table system according to claim 10, wherein the panel is offset being with respect to the slide such that the slide is positioned nearer to the first side edge than the second side edge.

12. The cockpit tray table system according to claim 10, further including:

a first guide being attached to the first lateral edge; and a second guide being attached to the second lateral edge, the first guide being positioned in one of the tracks and the second guide being positioned in another one of the tracks, the first and second guides being movable along the tracks;

each of the tracks having a terminal end positioned distal to the carriage, each of the front sections having a notch downwardly extending therein and being positioned adjacent to an associated one of the terminal ends; and the first and second guides being removably positionable in one of the notches to releasably lock the carriage in the deployed position.

13. The cockpit tray table system according to claim 10, wherein the bracket is attached to the arm distal to the carriage, the panel being positioned under the arm when the panel is in the lowered position, the panel being moved to the lowered position when the panel in the stored position.

14. The cockpit tray table system according to claim 10, wherein the bracket is movable on the bottom side of panel between the front and rear edges of the panel.

* * * * *